United States Patent
Millet et al.

(10) Patent No.: US 6,273,939 B1
(45) Date of Patent: Aug. 14, 2001

(54) PROCESS FOR PURIFYING A GAS STREAM OF ITS $N_2O$ IMPURITIES

(75) Inventors: Cyrille Millet, Paris; Serge Moreau, Velizy-Villacoublay; Georges Kraus, Paris; Jean-Pierre Gabillard, Auffargis, all of (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/421,224

(22) Filed: Oct. 20, 1999

(30) Foreign Application Priority Data

Oct. 20, 1998 (FR) .................................................. 98 13137

(51) Int. Cl.[7] .................................................. B01D 53/04
(52) U.S. Cl. ................................ 95/106; 95/120; 95/129; 95/138; 95/139; 95/143; 95/902
(58) Field of Search ...................... 95/114, 115, 117–120, 95/129, 128, 139, 143, 144, 902, 96–106

(56) References Cited

U.S. PATENT DOCUMENTS

| | | | |
|---|---|---|---|
| 4,477,267 | * 10/1984 | Reiss ...................................... | 95/139 |
| 4,971,606 | * 11/1990 | Sircar et al. ....................... | 95/902 X |
| 5,152,813 | * 10/1992 | Coe et al. .......................... | 95/902 X |
| 5,529,610 | * 6/1996 | Watson et al. ..................... | 95/139 X |
| 5,531,808 | * 7/1996 | Ojo et al. .......................... | 95/139 X |
| 5,810,909 | * 9/1998 | Notaro et al. ..................... | 95/139 X |
| 5,885,331 | * 3/1999 | Reiss et al. ....................... | 95/902 X |
| 5,914,455 | * 6/1999 | Jain et al. ......................... | 95/129 X |
| 5,919,286 | * 7/1999 | Golden et al. .................... | 95/129 X |
| 5,980,611 | * 11/1999 | Kumar et al. ..................... | 95/139 X |
| 6,053,966 | * 4/2000 | Moreau et al. .................... | 95/902 X |
| 6,068,678 | * 5/2000 | Labasque et al. ................. | 95/902 X |
| 6,080,226 | * 6/2000 | Dolan et al. ...................... | 95/129 X |
| 6,106,593 | * 8/2000 | Golden et al. .................... | 95/129 X |

FOREIGN PATENT DOCUMENTS

| | | |
|---|---|---|
| 32 44 370 | 6/1984 | (DE) . |
| 33 22 473 | 1/1985 | (DE) . |
| 0 718 024 | 6/1996 | (EP) . |
| 0 862 938 | 9/1998 | (EP) . |
| 1357053 | * 12/1987 | (SU) ...................................... 95/129 |

* cited by examiner

*Primary Examiner*—Robert H. Spitzer
(74) *Attorney, Agent, or Firm*—Young & Thompson

(57) ABSTRACT

A process, particularly of the TSA type, for separating impurities of the nitrogen protoxide ($N_2O$) and possibly carbon dioxide ($CO_2$) or ethylene ($C_2H_4$) type which are contained in a gas stream, such as air. The impurities of nitrogen protoxide type are removed on a faujasite zeolite having a Si/Al ratio of 1 to 1.5 and containing from 0 to 35% of $K^+$ cations, between 1 and 99% of $Na^+$ cations and between 1 and 99% of $Ca^{2+}$ cations, preferably at least 50% of $Ca^{2+}$ cations. The separation is preferably carried out at a temperature of approximately $-40°$ C. to $+80°$ C., preferably at room temperature. Advantageously, the process is employed for prepurifying atmospheric air before cryogenic distillation of the air thus prepurified.

13 Claims, 6 Drawing Sheets

PROCESS FOR PURIFYING A GAS STREAM OF ITS N₂O IMPURITIES

FIELD OF THE INVENTION

Figure 1:
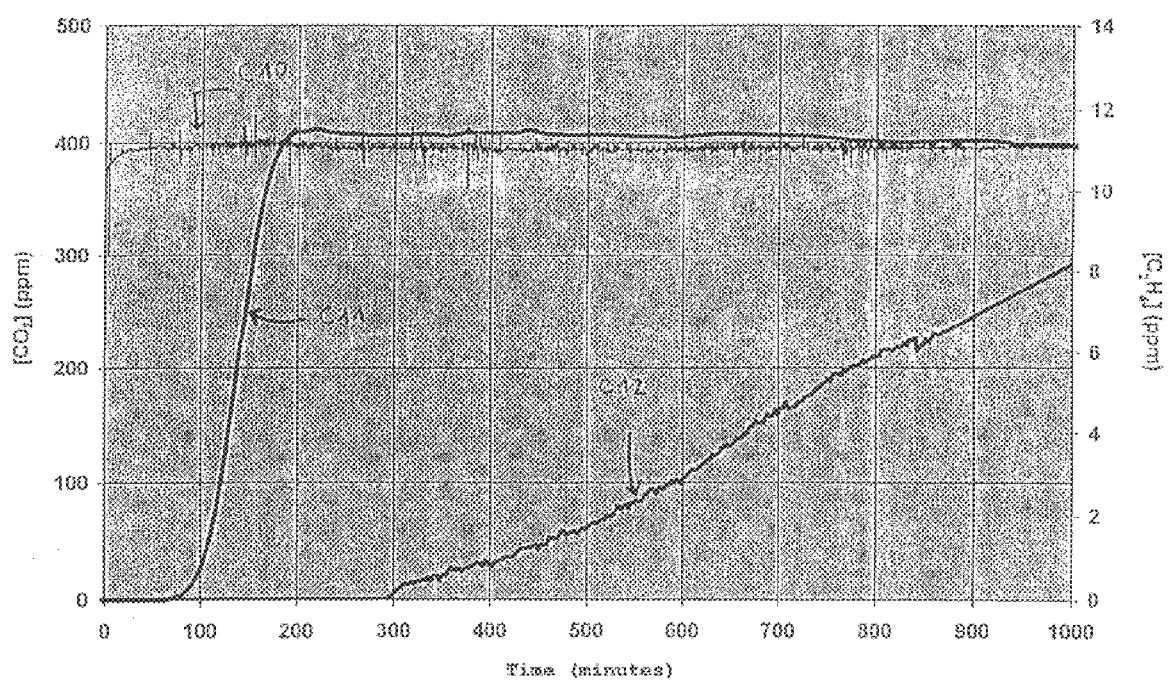

The present invention relates to a process for removing nitrogen protoxide ($N_2O$) and possibly water vapour ($H_2O$), hydrocarbons (CnHm) and/or carbon dioxide ($CO_2$) impurities contained in a gas stream and, more particularly, to the purification of air before cryogenic distillation.

BACKGROUND OF THE INVENTION

Before being able to be used in an industrial process, certain gases need to be stripped beforehand of the impurities that they contain.

Thus, atmospheric air, which generally contains approximately 250 ppm to 500 ppm of carbon dioxide ($CO_2$) and a variable amount of water vapour and/or hydrocarbons, such as ethylene, must be stripped of its impurities prior to any cryogenic separation operations, especially a cryogenic distillation operation.

This is because, in the absence of such a pre-treatment of the air, the impurities $CO_2$, and possibly $H_2O$ and/or hydrocarbons, which are found in it would solidify at low temperature and would then contribute to the clogging-up of the heat exchangers and distillation columns, which would lead, on the one hand, to possible degradation of the equipment and, on the other hand, to incorrect separation of the various constituents of the air, such as nitrogen or oxygen.

Furthermore, the hydrocarbons likely to be present in atmospheric air may accumulate in the liquid oxygen in the cold box and there is then a risk of the plant deteriorating.

In fact, it is known that, in a cryogenic distillation column, impurities having a boiling point higher than that of oxygen and present in atmospheric air are liable to be concentrated in the liquid bath in the bottom of the column.

For obvious safety reasons, it is desirable to reduce the concentration of hydrocarbons in liquid oxygen to the lowest possible level.

Thus, cryogenic distillation plants are generally equipped with an air prepurification unit intended to stop most of the impurities present in atmospheric air.

To do this, several techniques and processes have already been proposed.

A first technique for removing $CO_2$ and $H_2O$ impurities contained in a gas stream, such as air, consists in refrigerating these impurities, that is to say in making the impurities solidify or crystallize at low temperature. However, this technique is little used as it is very punitive from the point of view of equipment and energy costs.

An alternative to this technique is to remove carbon dioxide, and possibly water vapour, contained in the gas stream to be treated by adsorbing these impurities on a suitable adsorbent, such as a zeolite or an activated alumina.

Zeolites and aluminas are in fact among the adsorbents most commonly used in adsorption-type gas separation processes.

Thus, document U.S. Pat. No. 3,885,927 describes the use of an X zeolite exchanged to at least 90% with barium cations, which zeolite has a $CO_2$ adsorption capacity approximately 40% greater than an X zeolite containing only sodium cations.

Furthermore, document EP-A-284,850 describes a process for purifying a gas stream by adsorption on a faujasite-type zeolite, the Si/Al ratio is from 1 to 2.5, which faujasite is exchanged to at least 90% with divalent cations, such as strontium or barium cations.

Moreover, document U.S. Pat. No. 4,775,396 describes the preferential adsorption of carbon dioxide contained in a sweet gas, such as nitrogen, hydrogen and methane, using a PSA (Pressure Swing Adsorption) process with a fixed adsorption bed containing a faujasite-type zeolite exchanged to at least 20% with cations of the group formed from zinc, rare earths and ammonium and exchanged to at most 80% with alkali or alkaline-earth metal cations.

As regards document FR-A-2,335,258, this describes a process for purifying gas mixtures comprising nitrogen, hydrogen, argon and/or oxygen, and containing carbon monoxide, carbon dioxide and water impurities, by adsorption of the impurities on A- or X-type zeolites at a temperature of between −40 and +4° C. This document describes A-type zeolites exchanged from 70 to 82% with calcium ions and the Si/Al ratio of which is at most 1, and exchanged or unexchanged X-type zeolites, the Si/Al ratio of which is between 1.15 and 1.5. Conventionally, X zeolites with a Si/Al ratio of less than 1.15 are called LSX (Low Silica X) zeolites or silica-depleted zeolites.

Likewise, document EP-A-0,718,024 describes the removal of $CO_2$ contained in a gas stream by adsorbing the $CO_2$ on an X zeolite, the Si/Al ratio of which is at most approximately 1.15, at a temperature of between −50° C. and 80° C approximately. This document furthermore describes the results obtained using X or LSX zeolites which are unexchanged or exchanged with lithium and calcium or rare earth cations.

Furthermore, document U.S. Pat. No. 1,357,053 describes the use of a mordenite-type zeolite exchanged with barium cations in order to remove nitrogen protoxide, the regeneration of the adsorbent taking place above 180° C.

Moreover, document DD-A-6,225,345 recommends purifying the atmosphere for preserving foodstuffs by means of an adsorbent consisting of a mixture of active carbon and of an A zeolite exchanged with calcium cations.

However, the existing processes cannot be regarded as being completely satisfactory.

This is because some adsorbents, such as a standard 13X zeolite, normally used for removing $CO_2$ and water vapour impurities contained in air, allow certain other compounds, such as ethylene, propane, methane, ethane and/or nitrogen protoxide, which are liable to be present in air, to be stopped only partially, or even not at all.

This is also reported in the document Linde Reports on Science and Technology, 36/1983, Dr J. Reyhing, "Removing hydrocarbons from the process of air separation plants using molecular-sieve adsorbers".

Similarly, the document MUST'96, Munich Meeting on Air Separation Technology, Oct. 10–11, 1996, Dr U. Wenning, "Nitrous oxide in air separation plants", emphasizes the ineffectiveness of 5A-type zeolites to stop nitrogen protoxide ($N_2O$) contained in air.

Thus, in general, when considering ethane, propane, nitrogen protoxide and ethylene impurities possibly present in air at variable contents, it may be stated that:
  ethylene is an unsaturated hydrocarbon soluble in liquid oxygen up to a level of 30,000 ppm with a low solute-gas equilibrium coefficient. Its freezing point is −169° C., whereas the temperature of liquid oxygen is −181° C. at $1.2 \times 10^5$ Pa. Therefore, when no air pre-treatment is carried out or this treatment is insufficient, ethylene may be incompletely stopped and in this case it may be found in solid form in the cryogenic plant;

ethane and propane may be found in the liquid state at the temperature of liquid oxygen at $1.2 \times 10^5$ Pa; and as for nitrogen protoxide ($N_2O$), this poses a different problem for cryogenic air separation units since this compound is found everywhere in the atmosphere at a level of 0.3 ppm and with an annual increase in content of the order of 0.3%. Unlike the abovementioned hydrocarbons, nitrogen protoxide is inert in liquid oxygen and represents no risk as it is. However, it is nevertheless liable almost always to get into the distillation columns of cryogenic separation units and it can then form solid deposits, as in the case of carbon dioxide, in the exchangers and distillation columns. It is therefore desirable to prevent such deposits, which may degrade the performance of the equipment.

However, currently there is no really effective process for removing nitrogen protoxide ($N_2O$) impurities contained in a gas stream, particularly air, that can be used on an industrial scale.

This is because, although document EP-A-862,938 recommends the use of an unexchanged zeolite adsorbent, particularly of the 13X type, for removing NOx-type, especially $N_2O$, impurities, it turns out in fact that 13X zeolite is not effective, particularly for stopping $N_2O$, as will be demonstrated in the comparative tests carried out by the inventors of the present invention and presented below.

Moreover, another technique consists in purging or cold-adsorbing these impurities so as to prevent these impurities from reaching saturation level in the cryogenic separation unit.

However, this latter technique is very punitive from a costs standpoint, particularly energy costs, and therefore cannot be regarded as completely satisfactory.

SUMMARY OF THE INVENTION

The object of the present invention is therefore to improve the reliability of industrial plants and to improve the existing purification processes by solving the problem of the removal in particular of nitrogen protoxide ($N_2O$) impurities, and possibly of ethylene or other hydrocarbons, which are liable to be present in a gas stream, particularly in an air stream which must subsequently be separated by cryogenic distillation.

The present invention therefore relates to a process for separating at least nitrogen protoxide ($N_2O$) contained in a gas stream, in which process at least the nitrogen protoxide is adsorbed on at least one adsorbent comprising at least one faujasite zeolite having a Si/Al ratio of 1 to 1.50 approximately and containing at most 35% of $K^+$ cations, between 1 and 99% of $Na^+$ cations and between 1 and 99% of $Ca^{2+}$ cations.

Depending on the case, the process of the invention may comprise one or more of the following characteristics:

- the at least one adsorbent comprising at least one zeolite is of X or LSX type having a Si/Al ratio of 1 to 1.25 approximately, preferably at least one LSX zeolite having a Si/Al ratio of the order of 1;
- the at least one adsorbent comprising a mixture of at least one A zeolite and of at least one zeolite is of X or LSX type;
- the X or LSX zeolite contains at least 30% of $Ca^{2+}$ cations, preferably at least 50% of $Ca^{2+}$ cations, and even more preferably from 60 to 95% of $Ca^{2+}$ cations;
- it furthermore comprises at least one step of removing at least one impurity chosen from the group formed by water vapour, carbon dioxide, carbon monoxide, hydrogen and hydrocarbons, especially ethylene, propane and/or methane;
- the removal of at least some of the water vapour and carbon dioxide impurities is carried out over at least one bed of activated alumina particles;
- it is chosen from the group formed by TSA processes, preferably a TSA process carried out at a temperature of approximately $-40°$ C. to $+80°$ C.;
- it is carried out at a desorption pressure of $5 \times 10^5$ to $10^4$ Pa, preferably between $1.4 \times 10^5$ and $0.9 \times 10^5$, preferably at a desorption pressure approximately equal to atmospheric pressure;
- it is carried out at an adsorption pressure of $10^5$ to $10^7$ Pa, preferably between $3 \times 10^5$ and $6 \times 10^6$ Pa;
- it comprises at least one step of regenerating at least one adsorbent, preferably at a regeneration temperature of 50 to $250°$ C.; and
- the gas stream to be purified is air, preferably air subsequently separated by cryogenic distillation.

In the context of the present invention, the word "air" refers to external atmospheric ambient air or ambient air taken into a building or into a heated or unheated enclosure, which ambient air may possibly undergo a pre-treatment, such as an oxidative catalysis or an at least partial prior desiccation, or a modification of its content of one or more of its constituents, such as, especially, by adding or removing oxygen or nitrogen for example.

- the X or LSX zeolite furthermore contains cations chosen from alkaline-earth cations, preferably magnesium, strontium and/or barium cations;
- the adsorption is carried out in at least one adsorber and preferably in at least two adsorbers operating in parallel, that is to say one is in the production phase while the other is in the regeneration phase;
- it comprises at least one step of regenerating the adsorbent by flushing with residual nitrogen or another regeneration gas at a temperature of between $0°$ C. and $300°$ C., preferably at a temperature of between $50°$ C. and $250°$ C.

DETAILED DESCRIPTION OF THE INVENTION

The invention will now be described in greater detail with the aid of examples given by way of illustration, but entailing no limitation.

EXAMPLE 1

Synthesis of an LSX (Si/Al=1) Zeolite

The synthesis of an X zeolite of faujasite structure having a Si/Al ratio of less than or equal to 1.15, also called an LSX zeolite, is carried out in a conventional manner, as described especially in document GB-A-1,580,928.

The LSX zeolite obtained contains from 10 to 40%, generally from 20 to 30%, of potassium cations and from 60 to 90% of sodium cations; however, the possible presence of other cations is not excluded.

An LSX zeolite containing both sodium and potassium ions is usually called NaKLSX.

Starting from an NaKLSX zeolite thus synthesized, an ion exchange is carried out, in order to incorporate cations of one or more other metals, particularly calcium, into the NaKLSX zeolite, so as to substitute at least some of the potassium and/or sodium cations contained in the starting NaKLSX with calcium cations until the desired exchange level has been obtained.

In other words, starting from a NaKLSX, a CaNaKLSX, also called CaLSX, is obtained, that is to say a NaKLSX also containing calcium ions, by introducing the calcium ions into it by substitution of all or some of the $K^+$ and/or $Na^+$ cations.

In fact, as will be seen below, the calcium cations contained in an LSX zeolite have a considerable influence on, in particular, the $N_2O$ adsorption capacity of the zeolite when the latter is employed in a PSA-type or preferably TSA-type process intended especially for removing the $N_2O$ contained in a gas stream, particularly air.

EXAMPLE 2

Adsorption of $C_2H_4$ or $CO_2$ on a CaX Zeolite

Nitrogen artificially contaminated with 400 ppm of $CO_2$ (curve C10) or, as the case may be, with 15 ppm of ethylene ($C_2H_4$) is brought into contact with particles of 10X zeolite exchanged to approximately 96% with calcium cations (hereafter called CaX zeolite), the 4% of residual cations being essentially $K^+$ and $Na^+$ cations.

The adsorption of $CO_2$ or ethylene on the CaX zeolite is carried out at a pressure of $6 \times 10^5$ Pa, at a temperature of 20° C. and with a flow rate of 8.8 $Sm^3/h$, the CaX zeolite being inserted into a laboratory adsorber having a diameter of 60 mm.

The CaX zeolite particles have an average particle size of approximately 2 mm and the zeolite bed has a thickness of 25 cm.

The break-through curves (break-through times) obtained for $CO_2$ and ethylene are shown in FIG. 1, in which it may be seen that the CaX zeolite according to the present invention allows efficient removal of carbon dioxide for approximately 70 minutes (curve C11) and of ethylene for approximately 300 minutes (curve C12).

Within the context of the invention, the expression "break-through time" refers to the time separating the start of the adsorption operation and the appearance of $CO_2$ downstream of the bed of adsorbent with a level of 1 ppm.

EXAMPLE 3

Comparative Test of $C_2H_4$ and $CO_2$ Adsorption on an Unexchanged 13X Zeolite.

Example 3 is similar to Example 2, but this time the intention is to evaluate the $CO_2$ or ethylene ($C_2H_4$) adsorption performance of particles of unexchanged 13X zeolites according to the prior art.

The tests on 13X zeolites were carried out under the same conditions as those carried out on CaX zeolites (Example 2); in this case, the nitrogen is artificially contaminated with 450 ppm of $CO_2$ (curve C20) or 14 ppm of $C_2H_4$ (curve C22) before being brought into contact with the 13X zeolite.

Figure 2:
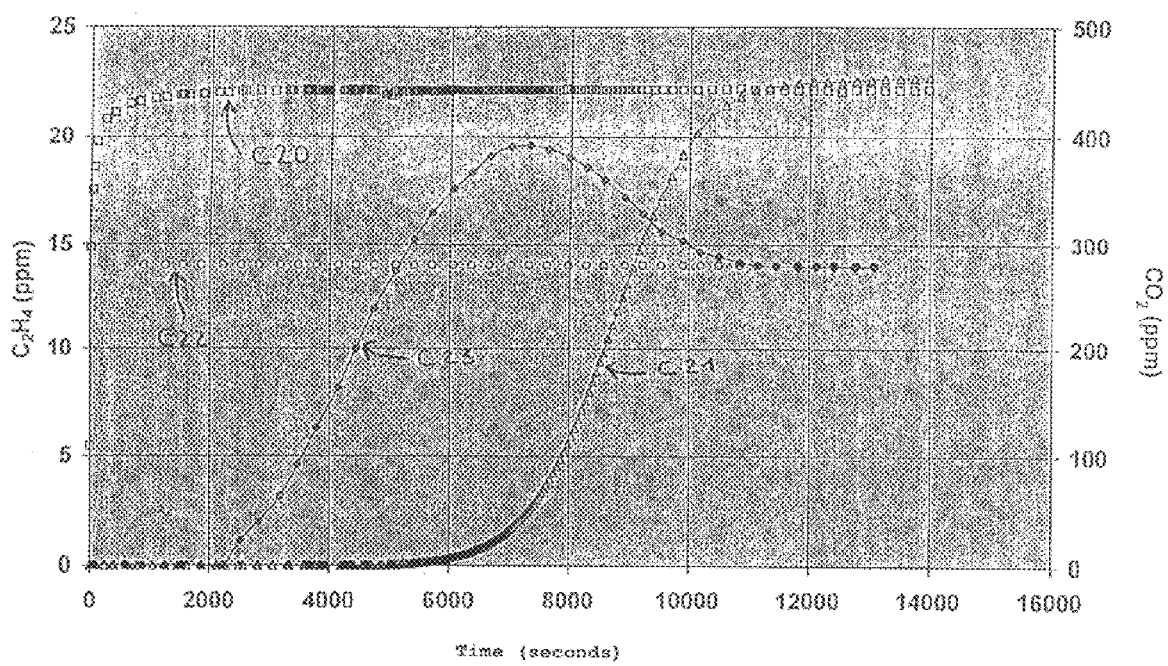

The results obtained are given in FIG. 2, in which it may be seen that, on an unexchanged 13X zeolite, the $CO_2$ break-through takes place after approximately 90 minutes (curve C21), that is to say for a time slightly longer than that for CaX.

By way of indication, FIG. 2 also shows curves C20 and C22 which represent the entry contents of $CO_2$ and $C_2H_4$ impurities, respectively, that is to say the contents of the gas stream before purification.

On the other hand, it appears that, on an unexchanged 13X zeolite, the ethylene break-through is 30 minutes (curve C23), whereas break-through for the CaX zeolite according to the invention took place only after 300 minutes.

These results clearly show that a CaX zeolite according to the invention has markedly improved ethylene adsorption performance compared with an unexchanged 13X zeolite according to the prior art.

EXAMPLE 4

Adsorption of $N_2O$ and $CO_2$ on a CaX Zeolite (containing 60% Ca)

This Example 4 is similar to Example 2, and its intention is to determine the nitrogen protoxide ($N_2O$) break-through time on a CaX adsorbent according to the invention.

To do this, as in Example 2, nitrogen is artificially contaminated with 0.9 ppm of nitrogen protoxide ($N_2O$) and then brought into contact with a bed of CaX zeolite particles exchanged to 60% with calcium cations (hereafter called CaX zeolite).

The CaX zeolite particles are beads approximately 2 mm in size.

The other experimental conditions are identical to those of Example 2.

Figure 3:
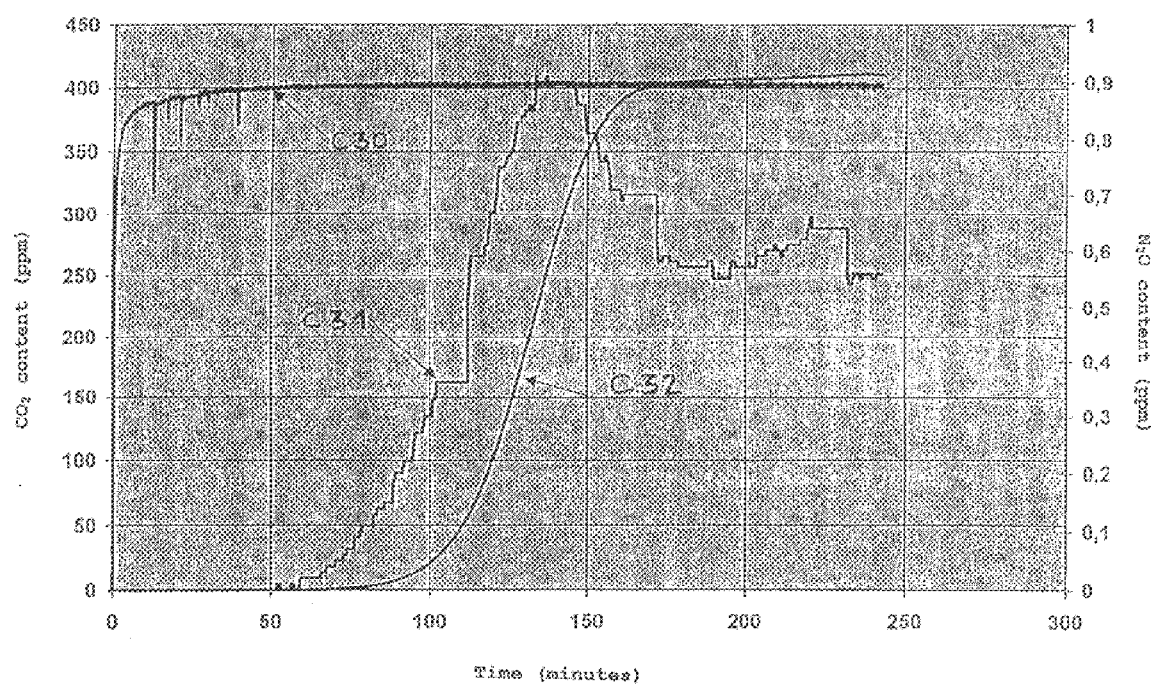

The results obtained are shown in FIG. 3, in which it may be seen that the $N_2O$ break-through took place only after approximately 60 minutes (curve C31), thus confirming the capability of the zeolite according to the invention to adsorb $N_2O$ effectively.

By way of indication, FIG. 3 also shows the start of the $CO_2$ break-through curve (curve C32) on CaX for 400 ppm of $CO_2$ in the incoming gas stream (curve C30).

This shows that, on CaX, the $CO_2$ break-through is almost simultaneous with the $N_2O$ break-through.

EXAMPLE 5

Regeneration of a CaX Zeolite Saturated with $N_2O$

An X zeolite exchanged to 60% with calcium cations is saturated with 0.5 ppm of-nitrogen protoxide ($N_2O$) at a pressure of $6 \times 10^5$ Pa.

Next, the zeolite is regenerated by bringing it into contact with a stream of a regeneration gas, for example nitrogen, at a temperature ranging up to 260° C. (curve C40).

The stream of regeneration gas is recovered at the outlet of the adsorber and is analysed in order to determine the variation in the amount of $N_2O$ desorbed (curve C41) as a function of the elapsed time and of the temperature of the regeneration gas.

Figure 4:
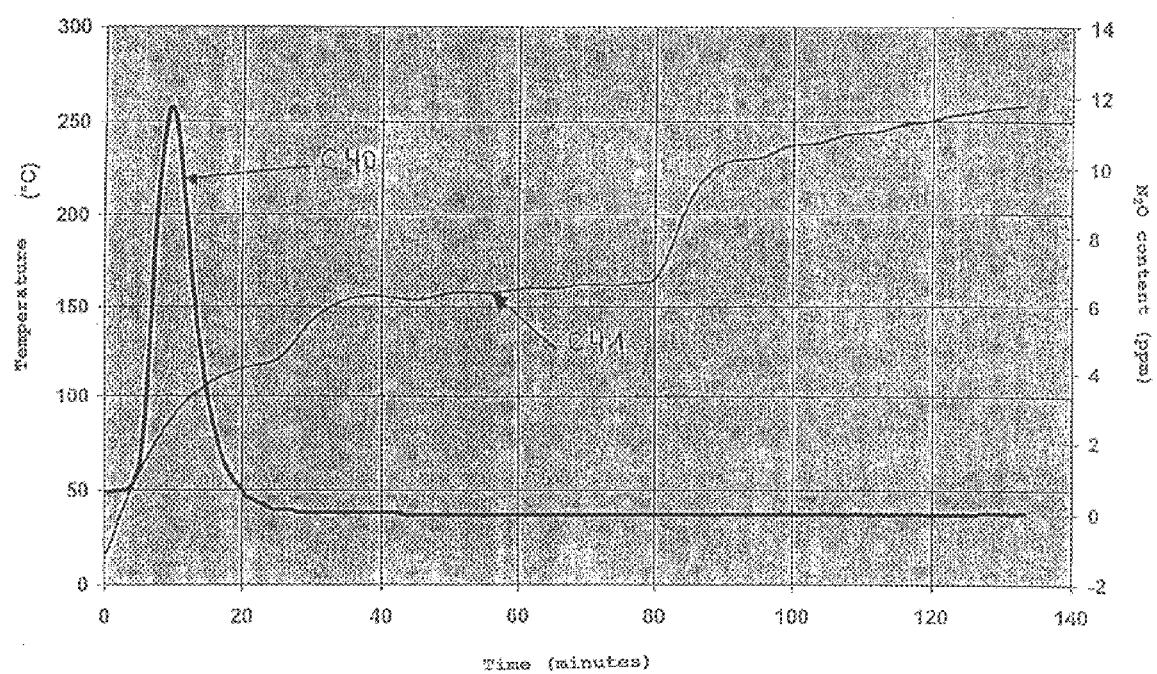

The results are given in FIG. 4, in which it may be seen that all the $N_2O$ impurities adsorbed on the CaX zeolite are desorbed for regeneration temperatures below 100° C.

Thus, it appears that, during regeneration of the zeolite, although the CaX has a stronger affinity for $N_2O$ than 13X, the desorption of the $N_2O$ adsorbed on the CaX zeolite particles may be carried out under conditions similar to those conventionally employed for regenerating particles of 13X zeolites, typically by flushing the particles with a hot gas, that is to say at a temperature of the order of 100° C.

In other words, according to the present invention, the regeneration of the CaX zeolite particles used for adsorbing $N_2O$ impurities contained in a gas stream may be carried out without an additional energy cost compared with a conventional process using a 13X zeolite, particularly in a TSA-type adsorption process.

EXAMPLE 6

Adsorption of $N_2O$ and $CO_2$ on a CaX Zeolite (containing 86% Ca)

This Example 6, which is similar to Example 4, is intended for determining the nitrogen protoxide ($N_2O$) break-through time on a CaX zeolite according to the invention, which CaX zeolite is exchanged to 86% with calcium cations (the degree of exchange was only 60% in Example 4).

Nitrogen is artificially contaminated with approximately 0.9 ppm of nitrogen protoxide or approximately 425 ppm of $CO_2$ (curve C50), and brought into contact with the particles of CaX zeolite exchanged to 86% with calcium cations.

The other experimental conditions are identical to those of Example 4.

Figure 5:
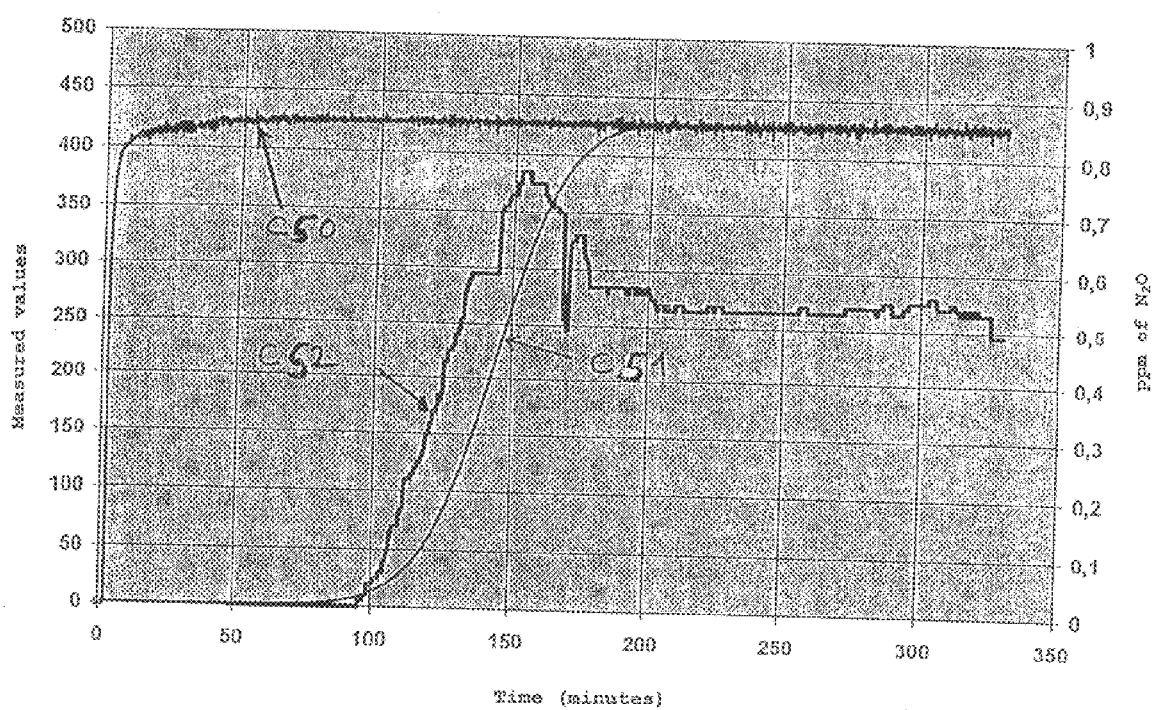

The results obtained are shown in FIG. 5, in which it may be seen that the $N_2O$ break-through (curve C52) and also the $CO_2$ break-through (curve C51) take place only after approximately 60 minutes, thus confirming the results of Example 4, that is to say the capability of the CaX zeolite according to the invention to adsorb $N_2O$ and $CO_2$ effectively.

EXAMPLE 7

$N_2O$ and $CO_2$ Adsorption on a Conventional 13X Zeolite

Tests similar to Examples 4 and 6 were carried out using a conventional unexchanged 13X zeolite as the adsorbent.

In this case, the stream of nitrogen to be purified is artificially contaminated with approximately 5.5 ppm of $N_2O$ and approximately 374 ppm of $CO_2$ and then brought into contact with 13X zeolite particles at a pressure of $6 \times 10^5$ Pa and at a purification temperature of about 20.5° C.

The results obtained (FIG. 6) show that the unexchanged 13X zeolite according to the prior art does not allow the $N_2O$ impurities to be stopped as effectively as a CaX zeolite according to the present invention.

Figure 6:
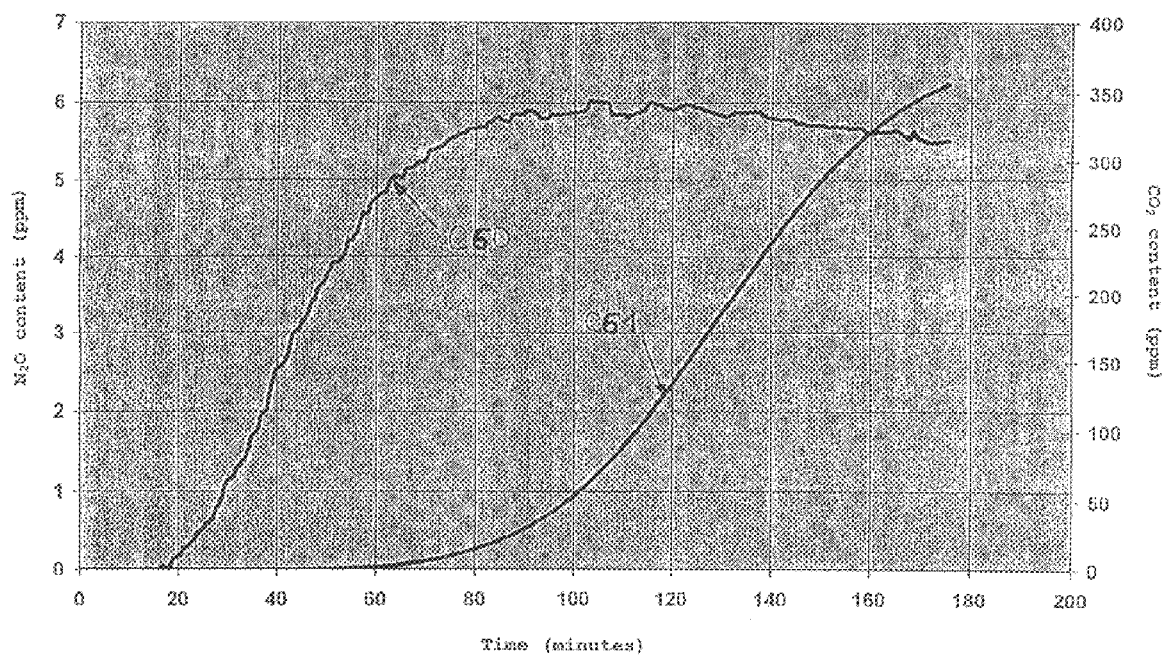

This is because, as may be seen in FIG. 6, break-through occurs after only 15 to 20 minutes in the case of the $N_2O$ impurities (curve C60) and after approximately 60 minutes in the case of the $CO_2$ impurities (curve C61) when a conventional 13X-type zeolite is used as the adsorbent in a TSA process.

EXAMPLE 8

Air Purification over CaX (Si/Al=1.25)

Atmospheric air containing 0.4 ppm of $N_2O$, 1 ppm of $C_2H_4$ and 400 ppm of $CO_2$ is brought into contact with particles of an X (Si/Al=1.25) zeolite exchanged to 60% with $Ca^{2+}$ ions and also containing approximately 27% of $Na^+$ and approximately 13% of $K^+$.

The adsorption temperature is approximately 20° C. and the adsorption pressure approximately $6 \times 10^5$ Pa.

After purification, the air is recovered and analysed.

It is found that the air thus purified is substantially free of $N_2O$, $C_2H_4$ and $CO_2$ impurities.

A 13X zeolite exchanged to 60% with $Ca^{2+}$ cations allows $CO_2$, $N_2O$ and ethylene in the air to be simultaneously stopped with a much smaller volume of adsorbent than if the 13X zeolite were employed.

EXAMPLE 9

Air Purification over CaLSX (Si/Al=1)

This Example 9 is similar to Example 8, that is to say atmospheric air containing 0.4 ppm of $N_2O$, 1 ppm of $C_2H_4$ and 400 ppm of $CO_2$ is brought into contact with particles of LSX zeolite (with Si/Al approximately equal to 1), that is to say a silica-depleted zeolite exchanged to approximately 85% with $Ca^{2+}$ ions and also containing $Na^+$ and $K^+$ cations ($Na+K \leq 15\%$).

The adsorption temperature is approximately 20° C., the adsorption pressure is approximately $6 \times 10^5$ Pa and, after purification, the air is recovered and analysed.

It is found that the air thus purified is, here again, substantially free of $N_2O$, $C_2H_4$ and $CO_2$ impurities, which confirms that an LSX zeolite exchanged to 85% with $Ca^{2+}$ cations allows $CO_2$, $N_2O$ and $C_2H_4$ in air to be effectively and simultaneously stopped.

What is claimed is:

1. Process for separating at least nitrogen protoxide ($N_2O$) contained in a gas stream, which comprises: adsorbing at least some of said nitrogen protoxide on at least one adsorbent comprising at least one faujasite zeolite having a Si/Al ratio of about 1 to about 1.50 and containing less than 12% of $K^+$ cations, $Na^+$ cations and between 50% and 99% of $Ca^{+2}$.

2. The process according to claim 1, wherein said at least one adsorbent comprises at least one X or LSX zeolite, and said Si/Al ratio is from about 1 to about 1.25.

3. The process according to claim 2, wherein said X or LSX zeolite contains from 60 to 95% of $Ca^{+2}$ cations.

4. The process according to claim 1, wherein said at least one adsorbent comprises an LSX zeolite, and said Si/Al ratio is about 1.

5. The process according to claim 1, wherein said at least one adsorbent comprises a mixture of at least one A zeolite and of at least one X or LSX zeolite.

6. The process according to claim 1, further comprising at least one step of removing at least one impurity selected from the group consisting of water vapor, carbon dioxide, carbon monoxide, hydrogen and hydrocarbons.

7. The process according to claim 6, wherein the removal of at least some of the water vapor and carbon dioxide impurities is carried out over at least one bed of activated alumina particles.

8. The process according to claim 1, wherein said process is a TSA process which is carried out at a temperature of −40° C. to +80° C.

9. The process according to claim 1, wherein said process is carried out at at least one of an adsorption pressure of $10^5$ to $10^7$ Pa and a desorption pressure of $5 \times 10^5$ to $10^4$ Pa.

10. The process according to claim 1, wherein said process is carried out at a desorption pressure approximately equal to atmospheric pressure.

11. The process according to claim 1, further comprising at least one step of regenerating said at least one adsorbent at a regeneration temperature of 50 to 250° C.

12. The process according to claim 1, wherein the gas stream to be purified is air.

13. The process according to claim 12, wherein the air is subsequently separated by cryogenic distillation.

* * * * *